Dec. 31, 1963  R. F. THIELMAN  3,116,038
ATTITUDE CONTROL SYSTEM
Filed Feb. 23, 1961  2 Sheets-Sheet 1
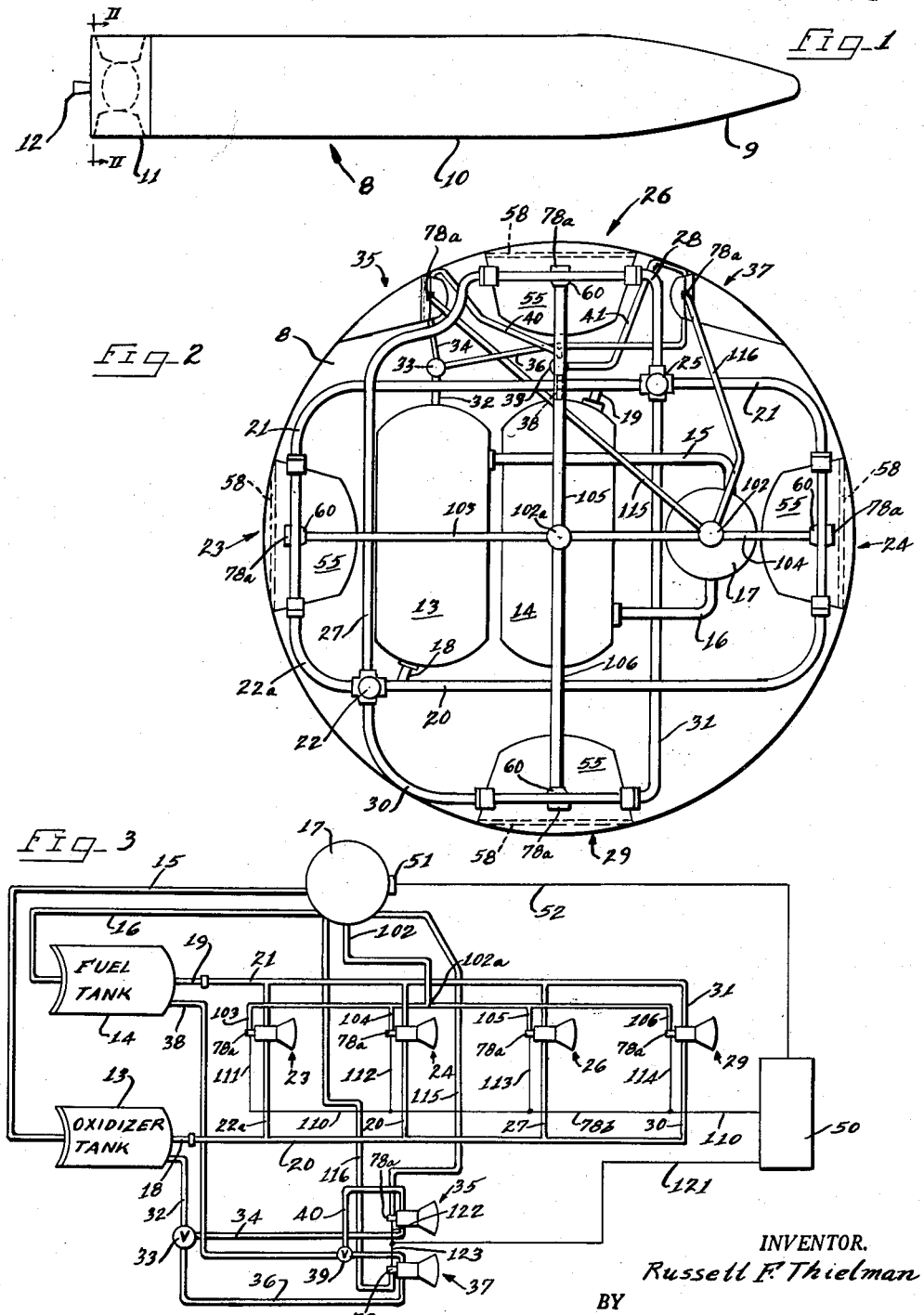
INVENTOR.
Russell F. Thielman
BY
ATTORNEYS Dec. 31, 1963 R. F. THIELMAN 3,116,038
ATTITUDE CONTROL SYSTEM
Filed Feb. 23, 1961 2 Sheets-Sheet 2
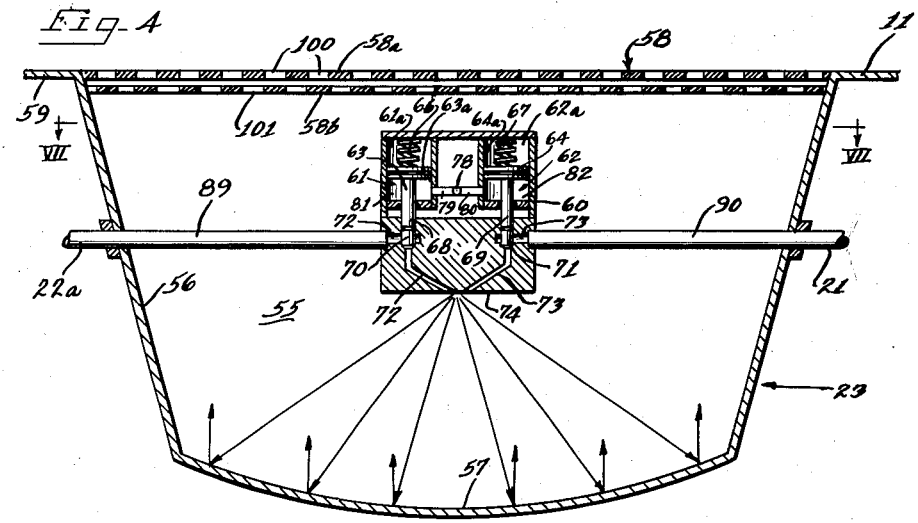
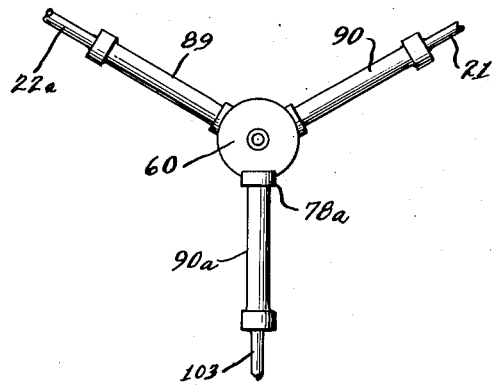
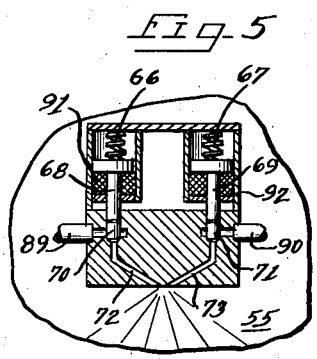
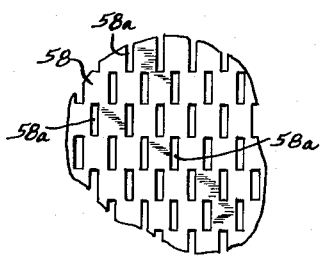
INVENTOR.
Russell F. Thielman
BY
ATTORNEYS United States Patent Office 3,116,038
Patented Dec. 31, 1963

3,116,038
ATTITUDE CONTROL SYSTEM
Russell F. Thielman, Cleveland, Ohio, assignor to Thompson Ramo Wooldridge Inc., Cleveland, Ohio, a corporation of Ohio
Filed Feb. 23, 1961, Ser. No. 91,272
13 Claims. (Cl. 244—78)

This invention relates to air and space borne vehicles and is more particularly directed to improved means and methods for controlling the attitude of such vehicles.

Heretofore, gimbal nozzle arrangements, gimbal reaction motors, jet vanes movable in the exhaust gas stream, and exterior vanes have been employed for controlling the attitude of air and space borne vehicles, such as missiles, rockets, satellites, nose cones and the like.

These prior art attitude control systems were quite complicated and increased the weight of the vehicle considerably.

With the present invention, the problems and difficulties of the prior art are substantially eliminated and the requirement for such complicated attitude control structures are substantially eliminated.

It is therefore an object of the present invention to provide an improved system for controlling the attitude of air and space borne vehicles in flight.

It is another object of the present invention to provide improved means for generating shock wave impulses in predetermined sequence to control the attitude of an air or space borne vehicle.

It is another object of the present invention to provide an attitude control system wherein shock wave impulses in predetermined sequence and magnitude are applied to an air or space borne vehicle to create a force counteracting moment for correcting the attitude of the vehicle in the pitch, yaw and roll planes.

A further object of the present invention is to provide shock wave impulses of extremely short duration for producing a counteracting movement of an air or space borne vehicle in the pitch, yaw and roll planes to thereby control the attitude of the vehicle.

Another object of the present invention is to provide an improved thrust control device for producing counteracting moment in the pitch, yaw and roll planes of an air or space borne vehicle.

Yet another object of the present invention is to provide improved methods for controlling the attitude of an air or space borne vehicle.

These and other objects, features and advantages of the present invention will become apparent from a careful consideration of the following detailed description when considered in conjunction with the accompanying drawing illustrating preferred embodiments of the present invention and wherein like reference numerals and characters refer to like and corresponding parts throughout the several views.

On the drawings:

FIGURE 1 is a generally schematic view of an air or space borne vehicle employing the thrust control system of the present invention;

FIGURE 2 is an end view of the vehicle taken along lines II—II of FIGURE 1;

FIGURE 3 is a generally schematic view of the attitude control system of the present invention;

FIGURE 4 is a view in cross-section of a thrust control device of the present invention;

FIGURE 5 is an alternative embodiment of the thrust control device of FIGURE 4;

FIGURE 6 is an enlarged fragmentary view in partial elevation illustrating the wall plate of the thrust device of FIGURE 4;

FIGURE 7 is a view along lines VII—VII of FIGURE 4.

As shown on the drawings:

Briefly stated, the present invention involves selective generation of explosive shock wave impulses of predetermined magnitude and duration which are employed to apply sequentially a force moment to the body of an air or space borne vehicle to counteract an undesired force applied to the vehicle in the pitch, yaw and roll planes and thereby control the attitude of the vehicle in these planes.

Although the present invention has a variety of applications, FIGURE 1 illustrates the application thereof in connection with a missile, rocket or orbiting satellite, generally indicated by the numeral 8, including a generally conical front end portion 9, a body portion 10 and a rear end portion 11 housing the reaction motor (not shown) providing the thrust propelling the vehicle 8. The reaction motor communicates with a gas discharge nozzle 12 which preferably is of the De Laval type.

In accordance with the present invention, the explosive shock wave impulses are generated hypergolically by contact of hypergolically reactive fuel and oxidizer in reaction proportions. For example, hydrazine and nitric acid may be employed.

Referring to FIGURE 2, an oxidizer tank 13 and fuel tank 14 may be suitably mounted in the vehicle 8. The oxidizer and fuel tanks may be pressurized through conduits 15 and 16 respectively by gases supplied from a gas generator 17. Each of the tanks 13 and 14 are provided with an outlet conduit 18 and 19 respectively supplying main conduits 20 and 21. Main conduit 20 communicates through an appropriate manifold fitting 22 at one end with a branch conduit 22a supplying the oxidizer to a thrust control device, generally indicated by the numeral 23. At its other end, conduit 20 communicates with a thrust control device, generally indicated by the numeral 24, constructed in accordance with the present invention. Similarly, the fuel tank main conduit 21 communicates with the thrust control device 23 and through an appropriate manifold connection 25 with the thrust control device 24. It will be observed that the thrust control devices 23 and 24 are preferably axially aligned and approximately 180° apart. Thus, a force applied by either thrust control device 23 or 24 will control the attitude of the vehicle 8 in the yaw plane which is the horizontal plane as viewed in FIGURE 2.

The oxidizer tank 13 communicates through the manifold connection 22 through a branch conduit 27, with a thrust control device 26 constructed in accordance with the present invention. The fuel tank 14 communicates through main line 21, manifold connection 25 and a branch conduit 28 with the thrust control device 26. The oxidizer tank 13 communicates through the manifold connection 22 and a branch conduit 30 with a thrust device 29. The manifold connection 25 communicates the fuel tank with the thrust control device 29 through a branch conduit 31. It will be observed that the thrust control devices 26 and 29 are located in the vehicle 8 at positions diametrically opposite each other. Thus the thrust control devices 26 and 29 may control the attitude of the vehicle in the pitch plane which is the vertical plane as viewed in FIGURE 2.

For controlling rolling moment of the vehicle 8, the oxidizer tank 13 may be connected through a main conduit 32 to a valve 33 for selectively supplying the oxidizer through a branch conduit 34 to a roll control device 35 or through a branch conduit 36 to a roll control device 37. Similarly, the fuel tank 14 may be connected through a main conduit 38 to a valve 39 for selectively supplying the fuel component through a branch conduit 40 to the control device 35 or through a branch conduit 41 to the roll control device 37. It will be noted that the roll control devices 35 and 37 are located on the vehicle 8 at locations permitting application of counteracting roll moment to the vehicle in both a clockwise and counterclockwise direction. For example, the roll control device 37 will produce a counterclockwise rolling moment to counteract clockwise forces applied to the vehicle whereas the roll control device 35 will apply a clockwise force to the vehicle to counteract counterclockwise rolling moment applied to the vehicle.

The gas generator 17 may contain a solid propellant and be actuatable to produce gases in response to a signal received from a remote source, such as the vehicle auto pilot system 50 (FIGURE 3).

The gases flowing through the conduits 15 and 16 will pressurize the oxidizer and fuel tanks respectively and force fuel through the lines 18 and 19 into the main lines 20 and 21.

The various branch conduits will then supply the fuel and oxidizer components to the respective thrust control and roll control devices for maintaining the correct orientation of the vehicle 8 in flight.

Referring to FIGURE 3, the guidance unit 50 of the vehicle may be employed to selectively actuate energization of the igniter 51 through a line 52 of the hot gas generator 17.

Each of the thrust control devices, 23, 24, 26 and 29 are similar in construction and operation. The following detailed description of the thrust control device 23, it will be appreciated, is equally applicable to the structure and operation of the thrust control devices 24, 26 and 29.

As appears in FIGURE 4, the thrust control device 23 includes a shock wave transmission chamber 55 defined by a recessed housing wall 56 of generally frusto-conical configuration, a parabolic bottom wall 57 and an opposed perforated top wall 58 which is flush with the wall 59 of the vehicle body 11. It will be appreciated that the thrust control device housing may be a separate structure and inserted in a recess formed in the missile wall.

Supported within the chamber 55 adjacent the outer wall 58 of the thrust control device is an injection control housing 60. The housing 60 contains a pair of chambers 61 and 62 housing pistons 63 and 64 respectively. The piston heads 63a and 64a divide the chambers 61 and 62 into opposed compartments. In the upper compartments 61a and 62a spring means 66 and 67 may be housed which urge the piston heads 63a and 64a downward thus positioning the stems 68 and 69 carrying valve heads 70 and 71 closing a pair of flow passages 72 and 73. Passages 72 and 73 are aligned adjacent the end wall 74 of the housing 60 in such a manner that the oxidizer supplied through passage 72 and fuel supplied through passage 73 impinge in the chamber 55 adjacent the end wall 74 of the housing 60 and hypergolically react with explosive force.

The operation of the explosive shock waves will now be described.

When the fuel and oxidizer components impinge and react in the chamber 55, a marked increase in temperature occurs in the chamber and a corresponding pressure is generated at the focal point of their impingement. A mean shock wave is generated thereby which travels with great velocity towards the parabolic bottom wall 57 of the chamber 55. On striking the bottom wall, the shock wave transmits a force to the vehicle which causes a moment to be applied to the vehicle in the direction of the force application. Thus, the orientation of the vehicle will change correspondingly.

The shock wave, upon contacting the bottom wall 57 is reflected as a plane shock which is dissipated upon striking the perforated missile top wall 58. The perforated top wall 58 serves additionally to diffuse air pressure resulting from the velocity of the missile in the vicinity of the thrust control device 23.

Thus, a pulsing principle may be employed for opening and closing of the valves 63 and 64 wherein the time interval during which the hypergolic constituents are permitted to flow through passages 72 and 73 is extremely small. Thus, the time interval between the pulses generated by the reaction of the hypergolic constituents may be controlled in such a manner that each generated shock wave is created, travels to the bottom wall 57, and is reflected to the perforated outer wall 58 before the next shock wave is generated. It will be appreciated, therefore, that by employing shock wave impulses controlled as to time and duration, the force applied by the shock waves may be controlled in magnitude and number, thereby controlling the movement of vehicle in the pitch and yaw planes precisely.

Means for controlling the number and magnitude of shock waves produced include the valves 63 and 64. As aforementioned, springs 66 and 67 urge the valve heads 70 and 71 to the closed position preventing flow of the oxidizer and fuel components into the chamber 55. For opening the valves 63 and 64, a conduit 78 communicates with branch conduits 79 and 80 leading to compartments 81 and 82 on the sides of the piston heads 63a and 64a opposite the springs 66 and 67. Thus, a pressurizing medium may be supplied to the chambers 81 and 82 to overcome the load of the springs 66 and 67 and lift the valve heads 70 and 71 from their seats permitting flow of fuel and oxidizer into the chamber 55.

Valve 78a controls flow in conduit 78 and chambers 81 and 82 may discharge through conduits 78, 79 and 80 to atmosphere, i.e. chamber 55, through valve 78a.

Valve 78a is energized by a signal or signals controlled as to number and duration by the auto pilot system 50. Thus, means are provided for reducing the pressure in compartments 81 and 82 whereby the springs 66 and 67 return the valves 63 and 64 to their normally closed position.

The housing 60 may be supported in chamber 55, as appears in FIGURE 7 on passaged spider arms 89, 90 and 90a. Arm 89 may be connected to the oxidizer conduit 22a for supplying the oxidzer to the chamber 55 whereas arm 90 may be connected to conduit 22a for supplying the fuel component to chamber 55. Arm 90a communicates through valve 78a and conduit 103 with the gas generator 17.

An alternative embodiment of valve means for controlling the flow of oxidizer and fuel components to chamber 55 appears schematically in FIGURE 5.

The piston stems 68 and 69 are centered in solenoids 91 and 92 of valve housings 93 and 94. Springs 66 and 67 normally urge the valve heads 70 and 71 to the closed position blocking communication between passages 89 and 72 and passages 90 and 73. In operation, energization of the solenoids 91 and 92 move the valve heads 70 and 71 from their seats and permit controlled flow of the oxidizer and fuel components into the chamber 55. The solenoids 91 and 92 may be actuated by the guidance unit or auto pilot system 50 of the vehicle.

It will be appreciated that with the control system appearing in FIGURE 5, more precise control of the quantity and duration of flow of the hypergolic constituents into chamber 55 is provided.

FIGURE 6 illustrates the exterior configuration of the upper wall 58 of the thrust control device 23. The upper wall 58 is provided with a plurality of apertures 58a. It will be appreciated that the upper wall 58 may comprise a pair of spaced grid elements 58a and 58b (FIGURE 4) secured to the side wall 56 of chamber 55 and may be slotted or perforated as at 100 and 101. The slots 100 and 101 are preferably not in alignment to increase thereby the dissipation effect on the shock waves.

The roll control devices 35 and 37 are similar in construction and operation to the thrust control devices 23, 24, 26 and 29. These devices 35 and 37 are positioned to apply opposed radial forces on the vehicle for controlling rolling moment of the vehicle in clockwise and counterclockwise directions.

As appears in FIGURE 3, a portion of the hot gases generated in the generator 17 are supplied through conduit 102, manifold 102a to branch conduits 103, 104, 105 and 106 and compartments 81 and 82 for controlling movement of the pistons 63 and 64. Control valves 78a control flow into the branch passages 79 and 80 (FIGURE 4) of each control devices 23, 24, 26 and 29. The control valves 78a are selectively actuatable from the normally closed position to permit flow to the desired control device by a signal or signals received from the autopilot system 50 through line 110 and branch lines 111–114. Valves 78a are selectively controlled by the autopilot system to discharge the pressurizing gases to atmosphere from chambers 81 and 82 by a signal received from the guidance unit.

It will be appreciated that the guidance or autopilot unit 50 selectively actuates the valves 78a of control devices 23 and 24 to control orientation of the vehicle in the yaw plane and selectively controls actuation of the valves 78a of control devices 26 and 29 to control orientation of the vehicle in the pitch plane. The duration of opening of the valves 78a may also be selectively controlled through the autopilot unit 50 to thereby control the magnitude of the shock waves generated in chamber 55. The number of shock waves generated may also be controlled by controlling the valves 78a, and, hence, the degree of movement of the vehicle in the pitch or yaw planes.

The valve means of the roll control devices 35 and 37 are also communicated with the gas generator 17 by conduits 115 and 116 and the valves 78a thereof are selectively actuated from the autopilot unit 50 which opens and closes valves 78a as required to selectively control the number and magnitude of the shock waves generated in the roll control devices. The signals from the autopilot 50 are relayed to valves 78a of the roll control devices from line 121, and branch lines 122 and 123.

Thus, with my invention, I provide an attitude control system for air and space-borne vehicles wherein shock wave impulses are selectively generated in a number and of a magnitude required to apply correctional forces to the vehicle in the pitch, yaw and roll planes and control the attitude of the vehicle in flight.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A system adapted to control the attitude of air and space borne vehicles comprising:
   a plurality of control devices carried by the vehicle and selectively controlling the attitude of the vehicle about the vehicle's pitch, yaw and roll planes, each device including;
   a chamber defined by a housing wall,
   a bottom wall, and an open top wall,
   a shock wave producing means mounted within said chamber,
   said shock wave producing means directing shock waves towards said bottom wall,
   a shock wave dissipation means mounted within said chamber dissipating the shock waves after they contact the bottom wall
   whereby the impact of the shock waves against the bottom wall of the chamber is used to control the attitude of the vehicle.

2. A system adapted to control the attitude of air and space borne vehicles comprising:
   a plurality of attitude control devices carried by the vehicle and selectively controlling the attitude of the vehicle about the vehicle's pitch and yaw planes, each device including:
   a chamber defined by a housing wall,
   a bottom wall, and an open top wall,
   hypergolically reactive fuel and oxidizer flow injector mounted in the chamber,
   said injection having controls separately controlling the amount of said fuel and said oxidizer flowing therethrough and impinging the fuel and oxidizer within the chamber to hypergolically react with explosive force and generating a mean shock wave,
   said injector position within said chamber to direct said shock waves towards said bottom wall,
   a shock wave dissipation means mounted within said chamber dissipating the shock waves after they contact the bottom wall
   whereby the impact of the shock waves against the bottom wall of the chamber is used to control the attitude of the vehicle.

3. A system adapted to control the attitude of air and space borne vehicles comprising;
   a plurality of attitude control devices carried by the vehicle and selectively controlling the attitude of the the vehicle about the vehicle's roll planes, each device including;
   a chamber defined by a housing wall,
   a bottom wall, and an an open top wall,
   a shock wave producing means mounted within said chamber,
   said shock wave producing means directing shock waves towards said bottom wall,
   a shock wave dissipation means mounted within said chamber dissipating the shock waves after they contact the bottom wall
   whereby the impact of the shock waves against the bottom wall of the chamber is used to control the attitude of the vehicle.

4. A system adapted to control the attitude of air and space borne vehicles comprising:
   a plurality of attitude control devices carried by the vehicle and selectively controlling the attitude of the vehicle about the vehicle's pitch, yaw and roll planes, each device including;
   a chamber defined by a frustro-conical housing wall,
   a parabolic bottom wall, and an open top wall,
   a shock wave producing means mounted within said chamber,
   said shock wave producing means directing shock waves towards said bottom wall,
   a perforated shock wave dissipation plate mounted across said open top wall dissipating the shock waves after they contact the bottom wall
   whereby the impact of the shock waves against the bottom wall of the chamber is used to control the attitude of the vehicle.

5. A system adapted to control the attitude of air and space borne vehicles comprising:
   a plurality of attitude control devices carried by the vehicle and selectively controlling the attitude of the vehicle about the vehicle's pitch, yaw and roll planes, each device including;
   a chamber defined by a frustro-conical housing wall,
   a parabolic bottom wall, and an open top wall,
   hypergolically reactive fuel and oxidizer flow injector mounted in the chamber,
   said injection having controls separately controlling the amount of said fuel and said oxidizer flowing therethrough and impinging the fuel and oxidizer within the chamber to hypergolically react with explosive force and generating a mean shock wave,
   said injector position within said chamber to direct said shock waves towards said bottom wall,
a perforated shock wave dissipation plate mounted across said open top wall dissipating the shock waves after they contact the bottom wall whereby the impact of the shock waves against the bottom wall of the chamber is used to control the attitude of the vehicle.

6. A system adapted to control the attitude of air and space borne vehicles comprising:
 a plurality of control devices carried by the vehicle and selectively controlling the attitude of the vehicle about the vehicle's pitch, yaw and roll planes, each device including
  a chamber defined by a recessed housing wall in said space vehicle,
  a parabolic bottom wall and an opposed perforated shock wave dissipation top wall,
  a shock wave producing means mounted within said chamber,
  said shock wave producing means directing shock waves towards said bottom wall,
  said top wall dissipating said shock waves after they contact the bottom wall whereby the impact of the shock waves against the bottom wall of the chamber is used to control the attitude of the vehicle.

7. A system adapted to control the attitude of air and space borne vehicles comprising:
 a plurality of control devices carried by the vehicle and selectively controlling the attitude of the vehicle about the vehicle's pitch, yaw and roll planes, each device including
  a chamber defined by a recessed housing wall in said space vehicle,
  a parabolic bottom wall and an opposed perforated shock wave dissipation top wall,
  hypergolically reactive fuel and oxidizer flow injector mounted in the chamber,
  said injection having controls separately controlling the amount of said fuel and said oxidizer flowing therethrough and impinging the fuel and oxidizer within the chamber to hypergolically react with explosive force and generating a mean shock wave,
  said injector position within said chamber to direct said shock waves towards said bottom wall,
  said top wall dissipating said shock waves after they contact the bottom wall whereby the impact of the shock waves against the bottom wall of the chamber is used to control the attitude of the vehicle.

8. A system adapted to control the attitude of air and space borne vehicles comprising:
 a plurality of control devices carried by the vehicle and selectively controlling the attitude of the vehicle about the vehicle's pitch, yaw and roll planes, each device including;
  a chamber defined by a housing wall,
  a bottom wall, and an open top wall,
  a shock wave producing means mounted within said chamber,
  said shock wave producing means directing shock waves towards said bottom wall,
  a shock wave dissipation means mounted within said chamber dissipating the shock waves after they contact the bottom wall,
  and signal responsive means for controlling operation of said shock wave producing means in response to a signal received from a remote source whereby the impact of the shock waves against the bottom wall of the chamber is used to control the attitude of the vehicle.

9. A system adapted to control the attitude of air and space borne vehicles comprising:
 a plurality of attitude control devices carried by the vehicle and selectively controlling the attitude of the vehicle about the vehicle's pitch and yaw planes, each device including;
  a chamber defined by a housing wall,
  a bottom wall, and an open top wall,
  hypergolically reactive fuel and oxidizer flow injector mounted in the chamber,
  said injection having controls separately controlling the amount of said fuel and said oxidizer flowing therethrough and impinging the fuel and oxidizer within the chamber to hypergolically react with explosive force and generating a mean shock wave,
  said injector position within said chamber to direct said shock waves towards said bottom wall,
  a shock wave dissipation means mounted within said chamber dissipating the shock waves after they contact the bottom wall,
  and signal responsive means for controlling operation of said shock wave producing means in response to a signal received from a remote source whereby the impact of the shock waves against the bottom wall of the chamber is used to control the attitude of the vehicle.

10. A device adapted to control the attitude of air and space borne vehicles and carried by said vehicles comprising:
 a chamber defined by a housing wall,
 a bottom wall, and an open top wall,
 a shock wave producing means mounted within said chamber,
 said shock wave producing means directing shock waves towards said bottom wall,
 a shock wave dissipation means mounted within said chamber dissipating the shock waves after they contact the bottom wall whereby the impact of the shock waves against the bottom wall of the chamber is used to control the attitude of the vehicle.

11. A device adapted to control the attitude of air and space borne vehicles and carried by said vehicles comprising:
 a chamber defined by a housing wall,
 a bottom wall, and an open top wall,
 hypergolically reactive fuel and oxidizer flow injector mounted in the chamber,
 said injection having controls separately controlling the amount of said fuel and said oxidizer flowing therethrough and impinging the fuel and oxidizer within the chamber to hypergolically react with explosive force and generating a mean shock wave,
 said injector position within said chamber to direct said shock waves towards said bottom wall,
 a shock wave dissipation means mounted within said chamber dissipating the shock waves after they contact the bottom wall whereby the impact of the shock waves against the bottom wall of the chamber is used to control the attitude of the vehicle.

12. A device adapted to control the attitude of air and space borne vehicles and carried by said vehicles comprising:
 a chamber defined by a frustro-conical housing wall,
 a parabolic bottom wall, and an open top wall,
 a shock wave producing means mounted within said chamber,
 said shock wave producing means directing shock waves towards said bottom wall,
 a perforated shock wave dissipation plate mounted across said open top wall dissipating the shock waves after they contact the bottom wall whereby the impact of the shock waves against the bottom wall of the chamber is used to control the attitude of the vehicle.

13. A device adapted to control the attitude of air and space borne vehicles and carried by said vehicles comprising:
   a chamber defined by a housing wall,
   a bottom wall, and an open top wall,
   hypergolically reactive fuel and oxidizer flow injector mounted in the chamber,
      said injection having controls separately controlling the amount of said fuel and said oxidizer flowing therethrough and impinging the fuel and oxidizer within the chamber to hypergolically react with explosive force and generating a mean shock wave,
   said injector position within said chamber to direct said shock waves towards said bottom wall,
   a perforated shock wave dissipation plate mounted across said open top wall dissipating the shock waves after they contact the bottom wall
whereby the impact of the shock waves against the bottom wall of the chamber is used to control the attitude of the vehicles.

References Cited in the file of this patent

UNITED STATES PATENTS

| | | |
|---|---|---|
| 1,879,579 | Stolfa et al. | Sept. 17, 1932 |
| 2,967,393 | Von Braun | Jan. 10, 1961 |
| 2,973,162 | Haeussermann | Feb. 28, 1961 |
| 2,974,594 | Boehm | Mar. 14, 1961 |

FOREIGN PATENTS

| | | |
|---|---|---|
| 879,835 | France | Mar. 5, 1943 |

OTHER REFERENCES

Control Engineering, vol. 7, No. 1, page 151, January 1960.

The Theory and Design of Gas Turbines and Jet Engines, pages 80 and 81, copyright 1950, McGraw-Hill Book Co. Inc., by E. T. Vincent.